United States Patent [19]

Van Heyningen

[11] 4,392,731
[45] Jul. 12, 1983

[54] PHOTOGRAPHIC FILM CARTRIDGE ASSEMBLIES WITH REMOVABLE FILTERS

[75] Inventor: Roger S. Van Heyningen, Rochester, N.Y.

[73] Assignee: Eastman Kodak Company, Rochester, N.Y.

[21] Appl. No.: 344,575

[22] Filed: Feb. 1, 1982

[51] Int. Cl.³ .............................................. G03B 17/26
[52] U.S. Cl. ..................................... 354/180; 354/83; 354/276
[58] Field of Search ....................... 354/21, 83, 84, 85, 354/86, 157, 174, 180, 202, 210, 275, 276, 295, 108

[56] References Cited

U.S. PATENT DOCUMENTS

| | | | |
|---|---|---|---|
| 3,631,773 | 1/1972 | Moodie | 354/108 |
| 3,696,716 | 10/1972 | Pasieka | 354/108 |
| 3,800,311 | 3/1974 | Olsson | 354/174 |
| 3,916,423 | 10/1975 | Ueda et al. | 354/108 |
| 3,993,488 | 11/1976 | Oishi | 354/276 |
| 4,149,790 | 4/1979 | Smith | 354/125 |

Primary Examiner—Alan Mathews
Attorney, Agent, or Firm—Milton S. Sales

[57] ABSTRACT

A film cartridge assembly is adapted to be received in cameras, and contains film which may or may not match the camera's exposure characteristics. A filter is carried by the cartridge to compensate for the exposure characteristics of cameras not matched to the film's photographic characteristic. The filter is selectively removable from the optical path of cameras having exposure characteristics matching that of the film, and automatic means are provided to effect such removal. In a preferred embodiment, cartridge assemblies including instant film units of a predetermined speed are provided with a neutral density filter at the exposure aperture. When inserted into a camera adapted for properly exposing such film units, the neutral density filter is removed by action of the camera before the first exposure is made. Cameras adapted to properly expose only film of slower speed do not effect removal of the filter, and the amount of light reaching the film during exposure is reduced by the presence of the filter in the exposure aperture.

6 Claims, 17 Drawing Figures

PHOTOGRAPHIC FILM CARTRIDGE ASSEMBLIES WITH REMOVABLE FILTERS

BACKGROUND OF THE INVENTION

1. Field of the Invention

The present invention relates to photographic film cartridge assemblies, and more particularly to such assemblies adapted for use in cameras having different predetermined exposure characteristics.

2. Description of the Prior Art

It is well known to provide film cartridges with coding indicative of an exposure characteristic such as the speed of the film therein, and to use such coding to adjust automatically the exposure controls of cameras adapted to respond to the code. Obviously, however, such coding will be ineffectual in cameras not equipped with code sensing and exposure adjusting means.

For various reasons, it may from time to time become desirable or possible (because of advances in film technology) to change the speed of commercially available film, such as by producing and marketing film having an increased sensitivity relative to earlier marketed film. Earlier cameras which were adapted to receive the earlier film would have to compensate for the increased film speed of the new film or the resultant pictures would be over exposed. And yet, the earlier cameras may not have been provided with means to accomplish such compensation. Thus, the manufacturer would be faced with the need to provide both the earlier type of film for use in the earlier cameras, and the new type of film for use in the new camera. This would add to the manufacturer's costs, require retailers to stock both film types, and possibly lead to consumer confusion at the time of sale.

SUMMARY OF THE INVENTION

In accordance with the present invention, a film cartridge assembly, including a cartridge body and film with a predetermined photographic characteristic, is adapted to be received in cameras which may or may not have matching exposure characteristics. A filter is carried by the cartridge to compensate for the exposure characteristics of cameras not matched to the film's photographic characteristic. The filter is selectively removable from the optical path of cameras havng exposure characteristics matching that of the film, and automatic means are provided to effect such removal.

In a preferred embodiment of the present nvention, cartridge assemblies containing instant (also called self-developing) film units of a predetermined speed are provided with a neutral density filter in the exposure aperture. When inserted into a camera adapted for properly exposing film of such predetermined speed, the neutral density filter is removed by action of the camera before the first exposure is made. Cameras adapted to properly expose only film of slower speed do not effect removal of the filter, and the amount of light reaching the film during exposure is reduced by the presence of the filter in the exposure aperture.

The invention, and its objects and advantages will become more apparent in the detailed description of the preferred embodiments presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENTS

Various terms such as "cartridge," "cassette," and "magazine" have been used to refer to film containers. Such a container and the film loaded therein is herein referred to as a "cartridge assembly." Because cartridges, cartridge assemblies, and photographic cameras for use therewith are well known, the present description is directed in particular to elements forming part of or cooperating more directly with preferred embodiments of cartridge assembly elements to which the present invention is specifically directed.

The present invention is particularly useful in cartridge assemblies of instant films. However, it is equally applicable for use in cartridge assemblies of conventional still and cine film.

Figure 1:
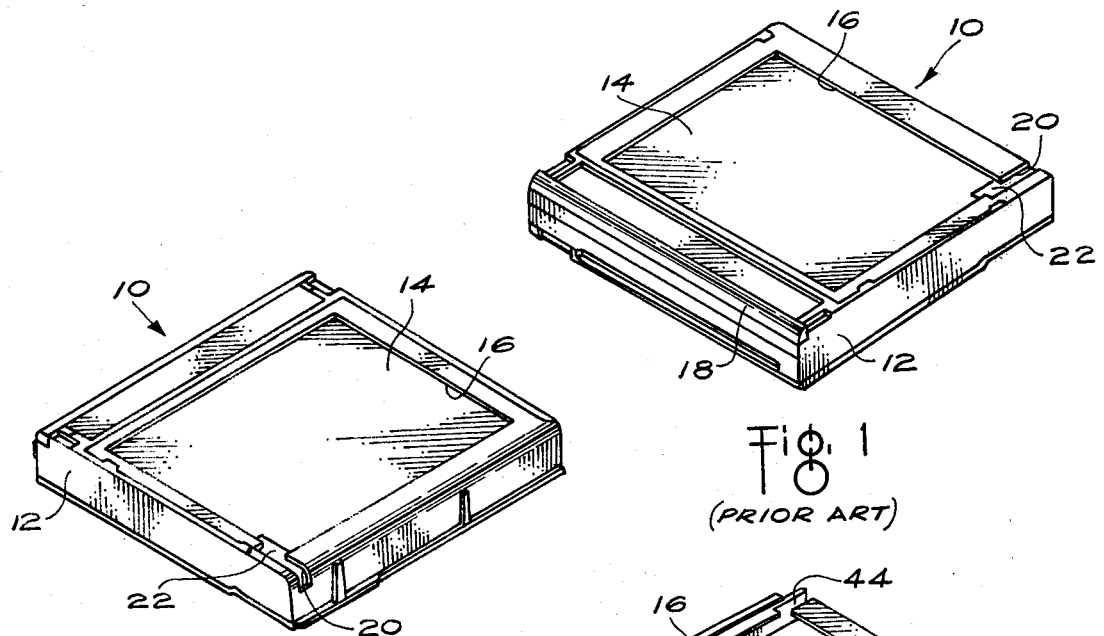
FIG. 1 is an exit slot end perspective view of a film cartridge assembly according to the prior art.
Figure 2:
FIG. 2 is a picker slot end perspective view of the cartridge assembly of FIG. 1.

FIGS. 1 and 2 are front and back perspective views, respectively, of a commercially available instant film cartridge assembly 10 such as that sold by the assignee hereof as Kodak instant color film PR10. A cartridge body 12 contains a plurality of film units, not shown, below a film cover 14 which protects the film units from light entering through an exposure aperture 16. The cartridge body further has a film unit exit slot (shown covered by a flap 18) and a picker slot 20 light sealed by a skirt 22 attached to film cover 14.

Figure 3:
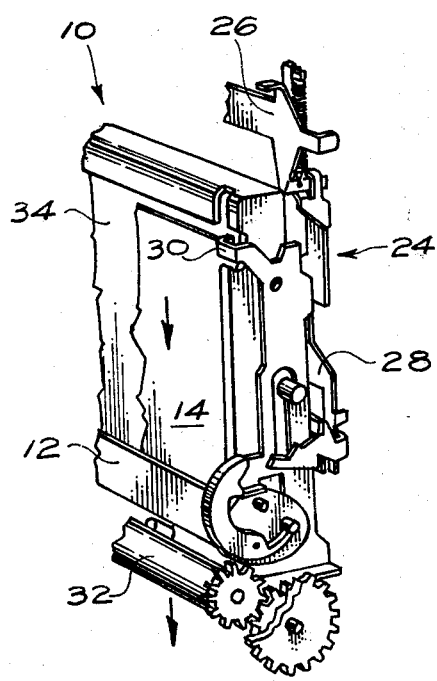
FIG. 3 is a perspective view of a portion of a camera film transport mechanism and of the cartridge assembly of FIGS. 1 and 2.

FIG. 3 shows a cartridge assembly 10 and its cooperation with a camera's film transport mechanism 24. Depression of the camera's shutter release lever 26 moves a clutch release slide 28 to initiate the transport cycle. As release slide 28 continues to move, its claw 30 engages film cover 14 and begins to move it out of cartridge body 12 and into the pin of driven rollers 32. The claw then disengages from the film cover, and the film cover is withdrawn from the cartridge body by the rollers to uncover the first film unit 34. The rollers also eject each film unit from the camera after its exposure.

In the hereinbefore described cartridge assembly and camera, the various exposure characteristics such as the sensitivity of the film and the camera exposure control are of course matched to provide properly exposed pictures.

Figure 4:
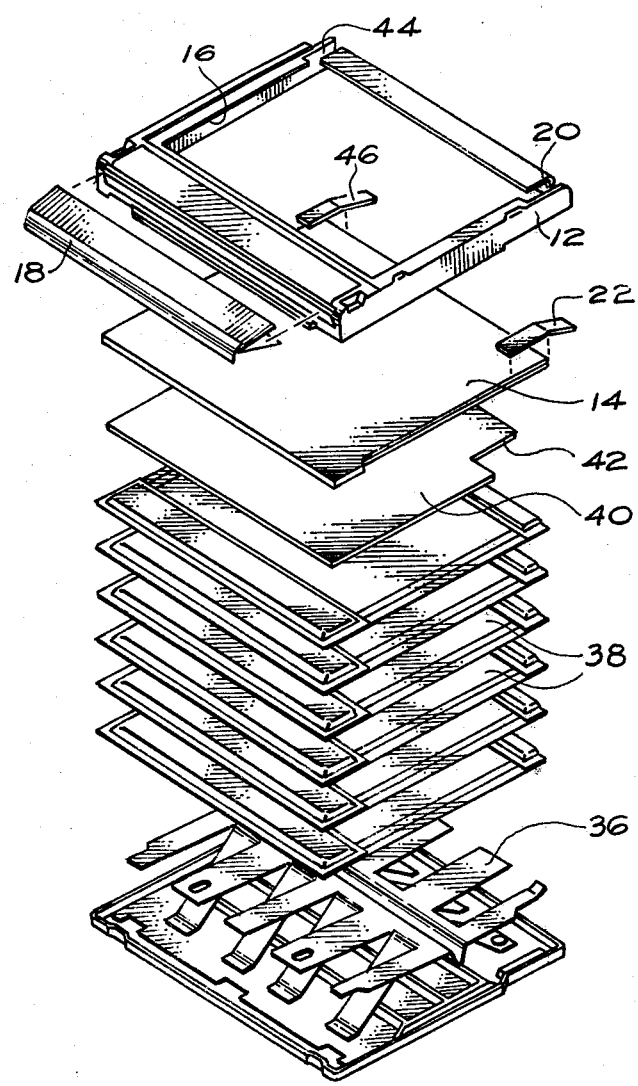
FIG. 4 is an exploded perspective view of a film cartridge assembly according to a preferred embodiment of the present invention.

FIG. 4 is an exploded view of a cartridge assembly according to the present invention. As in the case of the prior art cartridge assembly shown in FIG. 1, the cartridge assembly of FIG. 4 has a cartridge body 12, a film cover 14, an aperture 16, an exit slot flap 18 and a picker slot 20 light sealed by a skirt 22. A pressure plate 36 urges a plurality of film units 38 toward aperture 16.

It is intended that film units 38 have a different exposure characteristic such as a greater photographic sensitivity (faster), from those of the prior art units of FIGS. 1–3. Further, it is intended that the cartridge assembly of FIG. 4 be usable in the same camera as the cartridge assembly of FIGS. 1–3, as well as in cameras primarily designed to properly expose the film units, by compensating for the different exposure characteristics. Accordingly, we have provided a compensating filter 40 for use in the earlier cameras adapted for the film of FIGS. 1–3; the filter being removable from the optical path when the cartridge assembly is used in cameras adapted for the faster film.

In the case where the exposure characteristic is a change in film speed, filter 40 may be a neutral density filter. For example, the filter may be a neutral dyed gelatin filter, or sheets or coatings of other non-scattering light-absorbing material. One corner of neutral density filter 40 has been notched at 42.

Another difference in the cartridge assembly of FIG. 4 when compared to that of FIGS. 1 and 2 is the presence of a second picker slot 44 in cartridge body 12. A second skirt 46 on film cover 14 is aligned with slot 44 for light protection of the film units.

Figure 5:
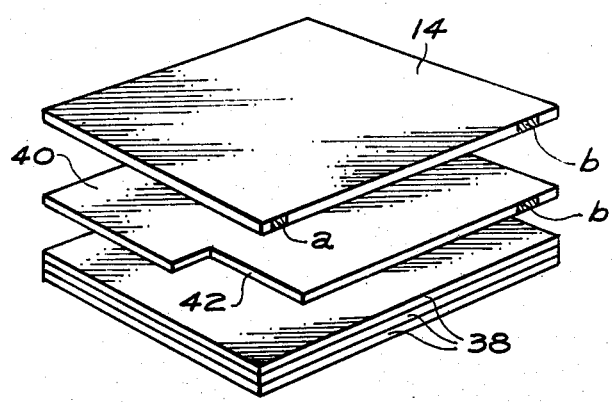
FIG. 5 is an exploded schematic view of a portion of the cartridge assembly of FIG. 4.

FIG. 5 is an exploded schematic view of the trailing edges of film cover 14, neutral density filter 40 and a few film units 38. Regions a and b on the trailing edges of the film cover and the filter have been identified in the drawing by shade lines. In this embodiment, these regions make up means for removing the film cover, filter and film units for the cartridge body. Region a on film cover 14 is aligned with claw 30 (FIG. 3) in earlier cameras which are adapted for properly exposing the slower film units of the cartridge assembly shown in FIGS. 1 and 2. Notch 42 in neutral density filter 40 is aligned with region a of cover 14. Regions b on cover 14 and filter 40 are aligned with the release slide claw of cameras specially designed to properly expose the faster film units 38 of the cartridge assembly shown in FIG. 4.

When the FIG. 5 assembly is used in cameras such as shown in FIG. 3, claw 30 contacts region a and drives film cover 14 into the nip of the camera rollers. Notch 42 prevents the claw from contacting filter 40 so that it remains in the cartridge body to absorb sufficient light during the picture taking process so that film units 38 are properly exposed. Filter 40 must, in such case, be thin enough so that claw 30 reaches the film unit directly below the filter to drive that film unit into the rollers after each exposure.

When used in cameras designed to properly expose picture units 38 without filter 40, the camera's release slide claw aligns with regions b and drives both film cover 14 and neutral density filter 40 into the camera rollers.

Figure 6:
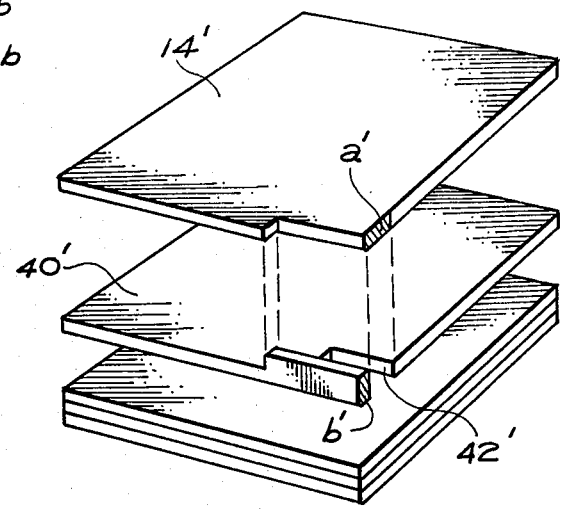
FIG. 6 is an exploded schematic view of a portion of a cartridge assembly of another preferred embodiment of the present invention.

Several alternative embodiments of the present invention will now readily occur to those skilled in the art. For example, FIG. 6 shows a notched film cover 14' with a region a' which would be aligned with claw 30 of a camera such as shown in FIG. 3. A slot 42' in neutral density filter 40' is aligned with region a' so that the filter stays in place when the film cover is driven into contact with the camera rollers. A camera adapted for higher speed film has a broader transport slide claw so that the claw accesses both the cover sheet at a' and the filter at b'.

Figure 7:
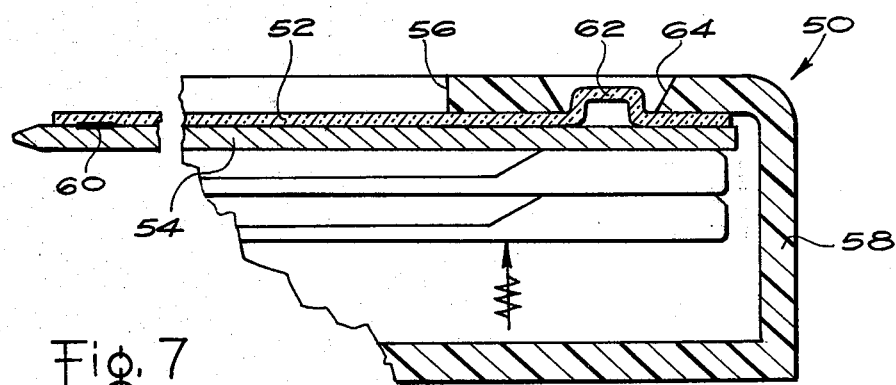
FIG. 7 is a partial sectional view of a cartridge assembly of another preferred embodiment of the present invention.
Figure 8:
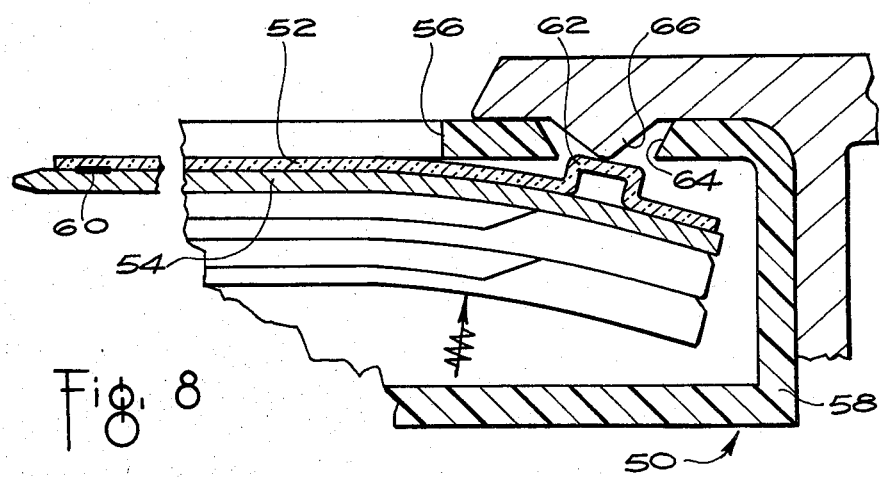
FIG. 8 is a partial sectional view of the cartridge assembly of FIG. 7 together with a portion of a camera.

Referring to the embodiment shown in FIGS. 7 and 8, a cartridge assembly 50 includes a neutral density filter 52 between a film cover 54 and exposure aperture 56 in cartridge body 58. The filter and the film cover are sealed together at 60. A boss 62 on the filter is received in a cut-out 64 in cartridge body 58. The filter is notched as at 42 in FIG. 5.

When the FIG. 7 cartridge assembly is used in a camera such as shown in FIG. 3, claw 30 drives film cover 54 into contact with the camera rollers. Filter 52 is notched as in FIG. 5. Boss 62 remains engaged in cut-out 64, and seal 60 is weak enough to shear. Filter 52 remains in the cartridge body to reduce the amount of light reaching the film units.

Cameras primarily designed to properly expose the picture units without filter 52 (herein referred to as cameras with "matching" characteristics) include a projection 66 such as shown in FIG. 8 to depress neutral density filter boss 62, disengaging the boss from cut-out 64. Now, as claw 30, FIG. 3, drives film cover 54, seal 60 pulls filter 52 with the film cover. The filter and the film cover are ejected from the camera.

Figure 9:
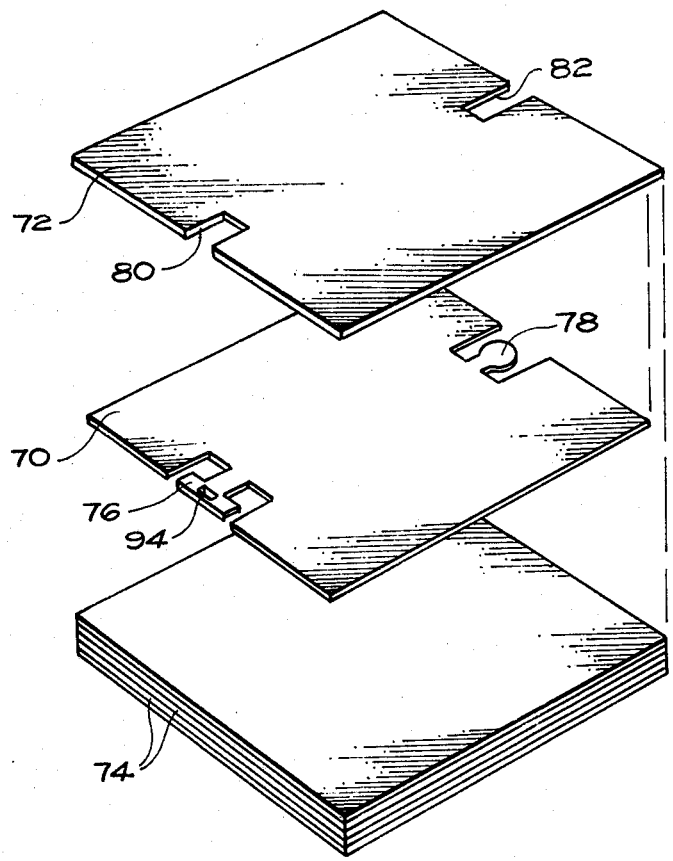
FIG. 9 is a schematic, exploded view of a portion of a cartridge assembly of another preferred embodiment of the present invention.
Figure 10:
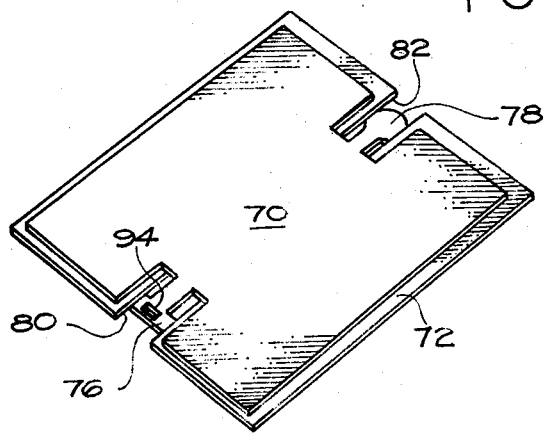
FIG. 10 is an assembled view of a portion of the cartridge assembly of FIG. 9 viewed from below filter 70.
Figure 11:
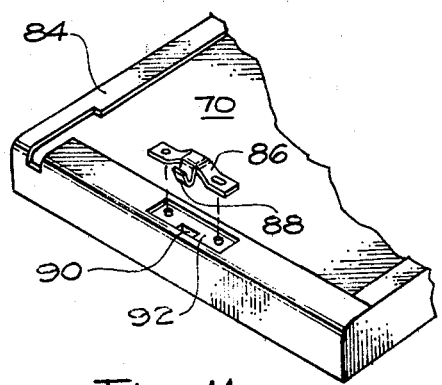
FIG. 11 is a partial view of another portion of the cartridge assembly of FIGS. 9 and 10.

The embodiment shown in FIGS. 9–11 provides for a neutral density filter 70 to be located between the film cover 72 and film units 74 to protect the filter from fingerprints during handling. A pair of tabs 76 and 78 on filter 70 pass through slots 80 and 82, respectively, in film cover 72 as shown in FIG. 10, which is a bottom view of the filter and cover. When tabs 76 and 78 are engaged in the slots, the filter and cover are effectively attached to each other, and are removed from the cartridge body as a single, integral unit.

The cartridge body, a portion of which is shown at 84 in FIG. 11, includes a metal clip 86 with a hook 88 extending into a hole 90 in the cartridge body. Clip 86 is carried in a recess 92 in the cartridge body on a pair of lugs such that hook 88 is free to move downwardly through hole 90 and into a hole 94 in tab 76 (FIGS. 9 and 10) when clip 86 is depressed. Clip 86 normally extends above the upper surface of cartridge body 84 to provide an interference fit with cameras such as shown in FIG. 3 designed to use a slower film.

The interference fit depresses clip 86, causing hook 88 to enter hole 94 in filter tab 76. When film cover 72 is transported by a camera picker which engages only the cover 72, hook 88 holds the filter back. Tab 78 pulls out of slot 82, and tab 76 slips out of slot 80, leaving neutral density filter 70 in the cartridge body.

Cameras designed to use the full speed of film units 74 have a clearance for clip 86 so that hook 88 does not enter hole 94. Thus, in such cameras filter 70 and film cover 72 will be transported from the cartridge body as a unit.

By locating the neutral density filter between the film cover and the film units, as in the embodiments of FIGS. 4-6 and 9-11, the filter is protected from dirt, fingerprints, scratches, etc. during handling by the customer. It may also be desirable to provide dust protection for the filter during manufacturing operations. FIGS. 12-17 illustrate another embodiment of the present invention wherein a neutral density filter 100 is sandwiched between a film cover 102 and a dust cover 104 to protect the filter during manufacture as well as during customer handling.

Figure 13:
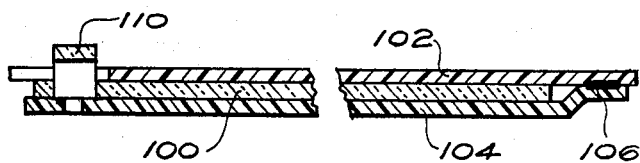
FIG. 13 is a sectional view of a portion of the cartridge assembly of FIG. 12.
Figure 12:
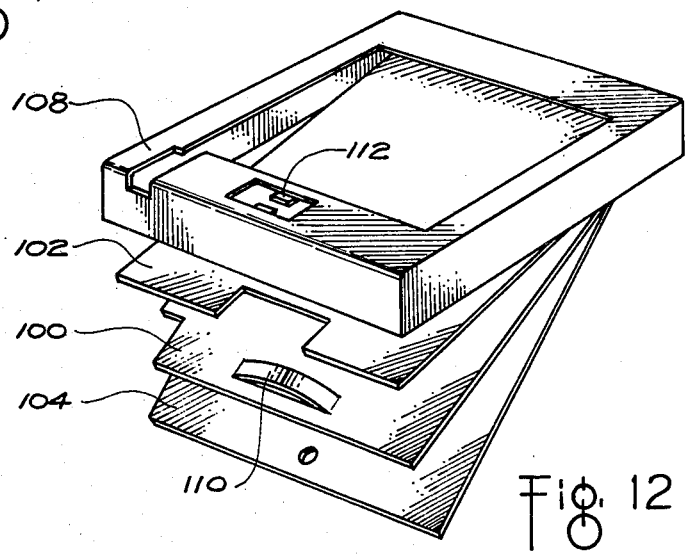
FIG. 12 is an exploded partial view of a cartridge assembly of another preferred embodiment of the present invention.

As can be seen in FIG. 13, dust cover 104 is permanently bonded at 106 to film cover 102. Neutral density filter 100 is interleaved between covers 102 and 104, and is not attached to either cover. The filter is releasably attached to cartridge body 108 during manufacture assembly by a locking strap 110 on the filter and locking tabs 112 on the cartridge body, as shown in FIG. 12.

Figure 14:
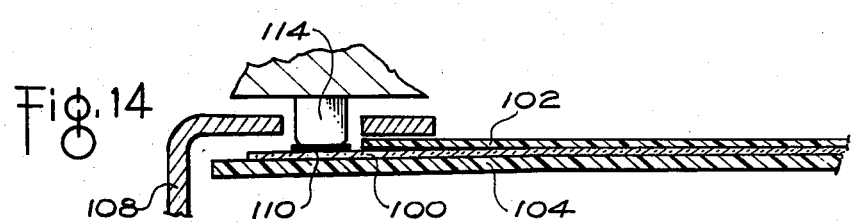
FIGS. 14 and 15 are partial schematic sectional views of the cartridge assembly of FIG. 12 being used in a camera.
Figure 15:
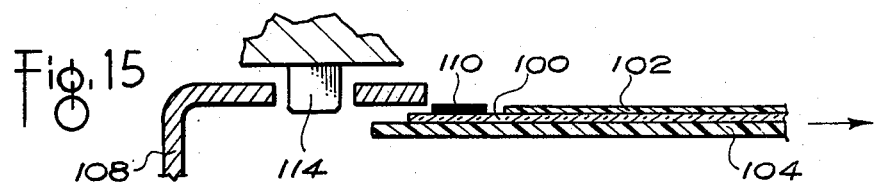
Figure 16:
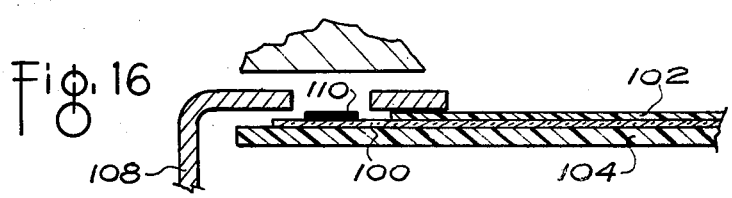
FIGS. 16 and 17 are views similar to FIGS. 14 and 15, respectively with the cartridge assembly being used in a different camera.
Figure 17:
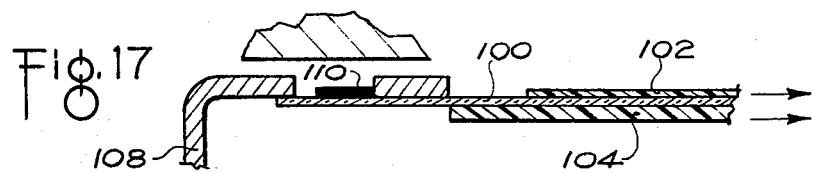

Cameras for use with high-speed film are equipped with a probe such as shown at 114 in FIG. 14. The probe forces filter locking strap 110 out of locking tabs 112 during cartridge assembly insertion into the camera. When film cover 102 is ejected, as shown in FIG. 15, the filter will travel with the film cover even though only the cover is engaged by the picker of the camera. The fact that the filter is sandwiched between the film cover and the dust cover assures that the filter will be ejected with the film cover due to friction. When the cartridge assembly is in a camera (FIG. 16) without a probe, the filter is retained in the cartridge body while the film cover and dust cover are ejected (FIG. 17).

The invention has been described in detail with particular reference to preferred embodiments thereof, but it will be understood that variations and modifications can be effected within the spirit and scope of the invention.

I claim:

1. A film cartridge assembly adapted to be received for exposure in cameras of two types, one of said types having a predetermined exposure characteristic and the other of said types having exposure characteristic other than the predetermined exposure characteristics, said cartridge assembly comprising:
   a cartridge body;
   photographic film in said cartridge body having a photographic characteristic matching the predetermined exposure characteristic of the one camera type;
   a filter carried by said cartridge body so as to be in the exposure light path to the film, said filter being adapted to compensate for the non-matching exposure characteristic of the other type of cameras; and
   means cooperative only with cameras of said one type of assuring removal of said filter from the light path of such cameras before film in the assembly is exposed by the camera.

2. A film cartridge assembly adapted to be received for exposure in cameras of two types, one of said types having a predetermined exposure characteristic and the other of said types having an exposure characteristic other than the predetermined exposure characteristic, said cartridge assembly comprising:
   a cartridge body;
   photographic film in said cartridge body having a photographic characteristic matching the predetermined exposure characteristic of the one camera type;
   a filter removably carried by said cartridge body so as to be in the exposure light path to the film, said filter being adapted to compensate for the non-matching exposure characteristic of the other type of cameras; and
   means operable only in cameras of said one type for assuring removal of said filter from the cartridge body before the film in the assembly is exposed by the camera.

3. A film cartridge assembly adapted to be received for exposure in cameras of two types, one of said types having a predetermined exposure characteristic and the other of said types having an exposure characteristic other than the predetermined exposure characteristic, each of the camera types having means for removing a film cover from the cartridge assembly; said cartridge assembly comprising:
   a cartridge body;
   photographic film having a photographic characteristic matching the predetermined exposure characteristic of the one camera type;
   a film cover closing the exposure light path to the film for protecting the film from light;
   a filter carried by said cartridge body so as to be in the exposure light path to the film, said filter being adapted to compensate for the non-matching exposure characteristic of the other type of cameras; and
   means, so structured in relation to the film cover and the film cover removing means of only the one type camera, for assuring removal of said filter from the light path of such cameras before the film in the assembly is exposed by the camera.

4. A film cartridge assembly adapted to be received for exposure in cameras of two types, one of said types having exposure characteristics matching a predetermined film speed and the other of said types having exposure characteristics matched to a film speed slower than the predetermined film speed, said cartridge assembly comprising:
   a cartridge body;
   photographic film of the predetermined speed in said cartridge body;
   a neutral density filter carried by said cartridge body so as to be in the exposure light path to the film, said filter being adapted to compensate for the slower speed exposure characteristics of the other type of cameras; and
   means operable only with cameras of the one type of assuring removal of said filter from the light path of such cameras before film in the assembly is exposed by the camera.

5. A film cartridge assembly adapted to be received for exposure in cameras of two types, one of said types having exposure characteristics matching a predetermined film speed and the other of said types having exposure characteristics matched to a film speed slower than the predetermined film speed, said cartridge assembly comprising:
   a cartridge body;

photographic film in said cartridge body of the predetermined speed;

a neutral density filter removably carried by said cartridge body so as to be in the exposure light path to the film, said filter being adapted to compensate for the slower speed exposure characteristics of the other type of cameras; and means operable only with cameras of the one type for assuring removal of said filter from said cartridge body before film in the assembly is exposed by the camera.

6. A film cartridge assembly adapted to be received in cameras of two types; one of said types having exposure characteristics matching a predetermined film speed and the other of said types having exposure characteristics matched to a speed slower than the predetermined film speed, each of the camera types having means for removing a film cover from the cartridge assembly; said cartridge assembly comprising:

a cartridge body;

photographic film in said cartridge body of the predetermined speed;

a film cover closing the exposure light path to the film for protecting the film from light;

a neutral density filter carried by said cartridge body so as to be in the exposure light path to the film, said filter being adapted to compensate for the slower speed exposure characteristics of the other type of cameras; and means, so structured in relation to the film cover and the film cover removing means of only the one type camera for assuring removal of said filter from the light path of such cameras.

* * * * *